United States Patent [19]
Sausaman et al.

[11] 3,785,855
[45] Jan. 15, 1974

[54] METHOD FOR COATING STEEL

[76] Inventors: David K. Sausaman, 7098 Williamsburg Ln., Terre Haute, Ind. 47802; Robert F. Purcell, 1501 Paul Dresser Dr., Terre Haute, Ind. 47803

[22] Filed: Jan. 14, 1972

[21] Appl. No.: 218,013

[52] U.S. Cl. .......... 117/75, 117/132 B, 117/161 UA
[51] Int. Cl. ......................... B32b 15/08, B44d 1/36
[58] Field of Search ........... 117/75, 161 UA, 132 B, 117/132 C; 260/89.7 R

[56] References Cited
UNITED STATES PATENTS
3,050,412   8/1962   Coe....................................... 117/75
3,700,635  10/1972   Brust et al...................... 260/89.7 R
3,418,157  12/1968   Katzer........................... 117/161 UA

*Primary Examiner*—Murray Katz
*Assistant Examiner*—Harry J. Gwinnell
*Attorney*—Robert H. Dewey and Howard E. Post

[57] ABSTRACT

A process for coating steel by applying thereto a monomer or partial polymer of an amide, represented by the formula

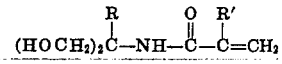

where R' is hydrogen, methyl or ethyl and R is methyl, ethyl, or hydroxymethyl, heating to effect further polymerization, applying thereto a solution or a dispersion of a vinyl halide polymer, copolymer, or terpolymer and heating to effect evaporation of the solvent or coalescence of the dispersion.

9 Claims, No Drawings

METHOD FOR COATING STEEL

BACKGROUND OF THE INVENTION

This invention relates to an improved method for coating steel. In a particular aspect this invention relates to a method for coating steel with a vinyl chloride polymer, copolymer or terpolymer and heating to effect the finished coating.

It is known to employ polymers and copolymers of vinyl chloride as a protective coating on steel and the steel so coated has many desirable properties. However, the use of such coatings has been disadvantageous because vinyl chloride polymers and copolymers are sensitive to the presence of ions of iron and undergo degradation when heated. Therefore, vinyl chloride-based solutions and dispersions applied to ferrous metals cannot be heated at elevated temperatures. Drying of solutions by evaporation at ambient temperatures requires a substantially longer drying time. Hence the output from the assembly line of vinyl coated articles is greatly reduced as compared with coated articles which can be force dried. Accordingly, there has been a need for an improved method for coating steel with vinyl chloride polymers, copolymers and terpolymers so that coatings based on these polymers can be baked without risk of degradation.

SUMMARY OF THE INVENTION

It is an object of this invention to provide an improved method for coating steel.

It is another object of this invention to provide a method for protecting from degradation due to iron ions vinyl chloride polymers and copolymers applied to steel.

It is yet another object of this invention to provide a method of coating steel with vinyl chloride polymers and copolymers whereby the coating can be baked.

Other objects will be apparent to those skilled in the art from the disclosure herein.

An improved method for coating the surface of a ferrous object with a vinyl chloride polymer or copolymer has been discovered. According to the present invention the ferrous surface to be coated is first coated with a film consisting essentially of a monomer or preferably a partial polymer, including partial copolymers, of a bis- or tris-(hydroxymethyl) acrylamide, or a solution thereof, corresponding to the formula

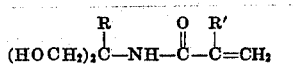

where R' is hydrogen, methyl or ethyl, and R is methyl, ethyl or hydroxymethyl. A solution or a dispersion of particles of the vinyl chloride polymer or copolymer is then applied to the amide film and baked at a temperature of about 250°–450°F, thereby evaporating the solvent from the solution, or coalescing the particles of the dispersion.

DETAILED DISCUSSION

The acrylamides suitable for the practice of this invention include but are not limited to acrylic, methacrylic or ethylacrylic amides of alkanolamines corresponding to the formula

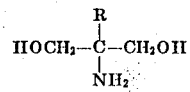

where R has the same meaning described hereinbefore.

These amides can be prepared by reacting an alkanolamine corresponding to the above formula with a lower alkyl ester of an acid corresponding to the formula

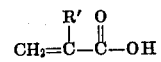

where R' has the same meaning described hereinbefore. The term lower alkyl ester includes generally esters of alcohols of one to four carbon atoms.

This reaction is effected in the presence of a catalyst and a polymerization inhibitor at reflux temperatures thereby forming said amide. The amide is then filtered to remove any solids, e.g., catalyst, and is then generally suitable for the practice of this invention.

More particularly, the amides useful in the present invention are prepared as follows. The alkanolamine and the acrylate ester are mixed in a mole ratio of from about 0.8–1.2 moles of alkanolamine per mole of ester. Preferably, however, the ratio is within the range of 0.9–1.1:1, respectively, and a ratio of about 0.9:1 is particularly preferred. To the mixture is added a catalyst in an amount of about 0.025–0.25 g/100 g of reactants, and a polymerization inhibitor in an amount of about 0.05–0.1 g/100 g of reactants. The reaction mixture is then transferred to a reaction vessel equipped with a reflux condenser, a heat source, a pressure reduction means, and a take-off head.

The mixture is heated, generally but not necessarily at reduced pressure, under total reflux conditions until it is determined that the alkanol portion of the ester is being separated. The reflux ratio is then preferably, but not necessarily, adjusted initially to about 3:1 and then eventually to total take-off, whereby the alkanol, as well as any excess acrylic or methacrylic ester, is separated from the reaction mixture.

The reaction mixture in the vessel is an alkanolamide corresponding to the formula

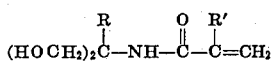

where R and R' have the same meaning hereinbefore defined.

The alkanolamide is then decanted or preferably, but not necessarily, filtered to remove any insoluble material.

The alkanolamines suitable for preparing the amides useful for the practice of this invention are those in which, to the carbon atom adjacent to the amino group, there are bonded three hydroxylakyl groups or two hydroxyalkyl groups and an alkyl group, e.g. methyl or ethyl. These alkanolamines include but are not limited to 2-amino-2-methyl-1,3-propane-diol; 2-amino-2-ethyl-1,3-propanediol; and 2-amino-2-hydroxy-methyl-1,3-propanediol. These latter compounds are preferred because they are commercially available and the usual commercial grade is suitable for the practice of this invention. Other alkanolamines meeting the foregoing definition are also suitable.

Suitable esters include, but are not limited to, the methyl and ethyl esters of acrylic and methacrylic acid. These esters are commercially available and the usual commercial grades are suitable for the practice of this invention. The methyl ester is preferred, e.g. for reasons of economy.

Suitable catalysts include lithium metal, or alkoxides of lithium, sodium or potassium. The alkoxides can be the methoxides, ethoxides, propoxides or butoxides, preferably the methoxide. The particularly preferred catalyst is lithium metal, preferably in sub-divided form. The amount of catalyst used is generally in the range of about 0.025 to 0.25 g/100 g of reactants. Generally about 0.025g/100 g is sufficient and therefore preferred.

The polmerization inhibitor can be any of the inhibitors known in the art, of which there are many, or a mixture thereof. Typical inhibitors include, but are not limited to, substituted catechols, 2,6-di-tertiary butyl-4-methylphenol (e.g. Ionol, marketed by Shell Chemical Company), and substituted hydroquinones such as 2,5-di-tertiary-amyl hydroquinone and 2,5-di-tertiary butyl hydroquinone.

The preferred acrylamide for the practice of this invention is N-[1,1-bis(hydroxymethyl)ethyl]-1-methacrylamide. Others suitable for the practice of this invention include but are not limited to:

N-[tris(hydroxymethyl)methyl]-1-methacrylamide
N-[1,1-bis(hydroxymethyl)propyl]-1-methacrylamide
N-[1,1-bis(hydroxymethyl)ethyl]-1-acrylamide
N-[1,1-bis(hydroxymethyl)ethyl]-1-ethacrylamide
N-[1,1-bis(hydroxymethyl)propyl]-1-ethacrylamide N-[tris(hydroxymethyl)methyl]-1-ethacrylamide
N-[1,1-bis(hydroxymethyl)propyl]-1-acrylamide Partial polymers of the foregoing acrylamides are preferred for the practice of this invention. The term partial polymer as used herein is intended to mean a polymer of somewhat higher molecular weight than the starting monomer, but capable of further polymerization at elevated temperatures or in the presence of a polymerization catalyst, many of which are know. These acrylamides can be partially polymerized in several ways. One method is to permit them to age at ambient temperatures for several weeks. Another method is to expose them to ultraviolet radiation for several hours, e.g. 5-15 hours. Yet another method is to heat the monomer at about 80°C in the presence of a catalyst, about 1 percent, for about 30 minutes. Suitable catalysts include di-tertiary butyl peroxide, tertiary butyl peroxypivalate, and dicumyl peroxide.

The acrylamide or partial polymer thereof is applied to the steel surface by any covenient method, i.e. by wiping, roller, brush, spray, calendaring, etc., in a quantity sufficient to provide a baked film of preferably about <0.05–1 mil. These amides and partial polymers thereof are liquids and can be applied to the steel undiluted. When desired, however, they are diluted to about 1-80 percent with any suitable solvent, many of which are known in the art. Typical solvents which can be used include, but are not limited to, lower alkanols, esters, ketones, aliphatic and aromatic hydrocarbons, nitroalkanes and chlorinated hydrocarbons. Preferred solvents include dimethyl formamide, 2-nitropropane, toluene and xylene. It is not intended that the invention be limited as to the method of applying the acrylamide or partial polymer thereof, nor limited as to the nature of the solvent, nor limited as to the concentration of amide in the solvent.

The steel article coated with the amide is heated to about 250°–450°F for a period of time sufficient to cause it to further polymerize. The heating, or baking step, is well known in the art of coating steel and any of the known methods are suitable for the practice of this invention. For example, the heating step can be effected by passing the article into a heated oven, or passing the steel over a flame or an electrically-heated element, etc. A heating period of 5-30 seconds or more is generally sufficient.

The steel article is then permitted to cool, e.g. to below about 60°C, preferably about 30°. A solution or dispersion (i.e. an "organosol" or "plastisol") of vinyl chloride polymer or copolymer is then applied by any suitable method, some of which were set forth above, in an amount sufficient to provide a dried film of about 1-2 mils or more as desired. The steel article is then again heated to 250°–450°F for a period of time sufficient to evaporate the solvent, when the polymer is applied as a solution, or to coalesce the film when applied as a dispersion, i.e. generally 0.5 to 5 minutes.

The term "steel article" and "ferrous surface" are intended to mean articles of steel, iron and alloys thereof, including but not limited to carbon steel, stainless steel, monel metal, wrought iron, cast iron, and the like, having a significant iron content, i.e. sufficient to cause degradation of vinyl halide polymers at elevated temperatures.

Suitable vinyl chloride polymers and copolymers include but are not limited to those generally designated "coating" resins. Generally they consist of vinyl chloride, copolymers of vinyl chloride 75-98 percent, vinyl acetate 2-25 percent and maleic acid, 0-2 percent.

Other coating resins include terpolymers of vinyl chloride 88-92 percent with acetate 3-5 percent and vinyl alcohol 5-7 percent; vinyl chloride 75-85 percent with vinyl acetate 14-20 percent, and glycidyl methacrylate 1-5 percent; vinyl chloride 40-80 percent and vinylidene chloride 20-60 percent; vinyl chloride and mono- or dibutyl acid maleates, or mixtures thereof having inherent viscosities of from about 0.2 to 1.8. It is not intended that the practice of this invention be limited to any particular vinyl chloride polymer or copolymer because the invention can advantageously be used with any such polymer which deteriorates in the presence of ions of iron.

Solvents for the above vinyl copolymers are well known in the art. They include ketones, i.e. methyl ethyl ketone, methyl isobutyl ketone, cyclohexanone, tetrahydrofuran, mixtures of aromatic hydrocarbons and nitroalkanes, esters, chlorinated hydrocarbons, etc. The formulation and use of such solutions are well-known in the art and it is not intended that the practice of this invention be limited to any particular vinyl chloride polymer or copolymer or solution thereof.

The practice of this invention is not limited to solutions of vinyl chloride polymers and copolyers but is equally applicable to dispersions. Generally, these dispersions consist of comminuted high molecular weight vinyl chloride polymers dispersed in a volatile medium, e.g. an aliphatic hydrocarbon, (a composition commonly designated "organosols"), or a non-volatile plasticizer, e.g. dioctyl phthalate, (a composition commonly designated a "plastisol"). Upon heating, the particles coalesce, and, in the case of organosols, the medium evaporates.

The invention will be better understood with reference to the following examples. It is understood, however, that the examples are intended for illustration only, and it is not intended that the invention be limited thereby.

EXAMPLE 1

2-Amino-2-ethyl-1,3-propanediol (AEPD), 119 g (1 mole) and methyl methacrylate, 100 g (1 mole) were charged to a 500 ml round-bottom flask equipped with an agitator, an air sparger, and a thermometer. Sodium methoxide 0.50 g and ditertiary-amyl hydroquinone (AHQ), 0.50 g, dispersed therein. Dry air was introduced under the surface of the liquid and heat was applied to the reaction mixture at atmospheric pressure. The column head was set for total reflux. At a vapor temperature of 65° and a liquid temperature of 95°, distillate removal was begun at a reflux ratio 3:1. After about two hours, the liquid temperature had risen to 136° and the vapor temperature to 67°. About 28 g of distillate - mostly methanol - had been collected. The reaction product in the pot was N-[1,1-bis(hydroxymethyl)-ethyl]-1-methacrylamide.

A film of 0.1 mil thickness of the foregoing amide was applied by wiping to one half of a steel D-panel. It was polymerized by baking for 1 minute at 400°F.

A solution of a copolymer of vinyl chloride and butyl maleate was applied over the entire panel in a quantity sufficient to form a dry film, after evaporation of solvent, of 0.6 ± 0.2 mil thickness. The vinyl chloride was in a ratio of 3:1 to the butyl maleate, which consisted of dibutyl maleate and mono-butyl maleate in a ratio of 4:1 (Exon 470 manufactured by Firestone Tire and Rubber Company was the copolymer used). It was dissolved in a mixture of toluene and methyl isobutyl ketone in about a 1:1 ratio thereby forming a solution containing 20 percent by weight of solids.

The coated panel was baked for 15 min. at 400°F. The vinyl copolymer cting over the amide was intact, though moderately discolored, whereas the vinyl copolymer applied to bare steel was totally degraded, black in color and lacked film integrity.

EXAMPLE 2

The experiment of Example 1 was repeated in all essential details except that N-[tris(hydroxymethyl)methyl]-1-methacrylamide was used as the amide. The vinyl chloridemaleate copolymer was protected by the amide during the baking step.

EXAMPLE 3

The experiment of Example 1 was repeated in all essential details except that the amide film applied to the steel panel was polymerized by passing the pan through the flame of a Fisher high temperature gas burner for about two seconds. The coated side of the panel was exposed to the flame about 2 inches above the burner orifice.

After the panel had cooled, the vinyl chloride-maleate copolymer of Example 1 was applied and the panel was baked for 15 minutes at 400°F. The portion of the polyvinyl chloride-maleate protected by the amide polymer was intact and only slightly discolored. The unprotected portion of the polyvinyl chloride-maleate film was totally degraded, black in color and lacked film integrity.

EXAMPLE 4

The experiment of Example 3 is repeated in all essential details except that N-[1,1-bis(hydroxymethyl)propyl]-1-methyacrylamide is used as the amide. The amide polymer protects the polyvinyl chloride-maleate film from degradation.

EXAMPLE 5

A thin film of N-[1,1-bis(hydroxymethyl)ethyl]-1-methacrylamide was applied to one half of a steel panel by wiping. The panel was exposed to ultra-violet radiation at a distance of 12 inches from three 40 watt U-V tubes having a peak output at 3654A for seven hours, thereby polymerizing the amide.

A 20 percent by wt solution in a 1:1 mixture of methylisobutyl ketone and toluene of a vinyl chloride/vinyl acetate/maleic acid terpolymer hving a ratio of 84:15:1 (the resin used was Bakelite vinyl resin VMCC manufactured by Union Carbide Corporation, New York) was applied to the panel in an amount sufficient to provide a dry film of about 0.6 mil after evaporation. The coated panel was baked for 7 min. at 350°F. The vinyl terpolymer protected by the amide polymer was intact and only slightly discolored. The unprotected polymer was totally degraded, black in color, and lacked film integrity.

EXAMPLE 6

A sample of the amide prepared by the procedure of Example 1 was partially polymerized by permitting it to age at ambient temperature for about two weeks. It was of low molecular weight and had a soft, tacky, rubbery consistency. It was dissolved in a 3:1 mixture of 2-nitropropane and methanol at a concentration of 15 percent. An amount sufficient to provide a dry (by evaporation) film thickness of <0.1 mil was drawn down on one-half of a steel panel. The panel was then baked for five min. at 350°F and allowed to cool.

The vinyl terpolymer solution of Example 5 was applied in an amount sufficient to provide a dry film thickness (by evaporation) of about 0.6 mil over the entire panel. It was then baked for seven minutes at 350°F.

The unprotected vinyl film was severely degraded, black, and without film integrity. The protected vinyl film was unaffected and wholly intact.

EXAMPLE 7

The experiment of Example 6 is repeated in all essential details except that N-[1,1-bis(hydroxymethyl)-ethyl]-1-acrylamide is used as the amide.

The unprotected vinyl film is severely degraded, black, and without film integrity. The protected vinyl film is unaffected by heating, but the unprotected film is black and lacking in film integrity.

EXAMPLES 9-11

The experiment of Example 1 is repeated in all essential details except that the vinyl oxazoline identified below is substituted for the vinyl oxazoline of Example 1.

| Example No. | Vinyl Oxazoline |
|---|---|
| 9 | N-[1,1-bis(hydroxymethyl)propyl]-1-ethacrylamide |
| 10 | N-[tris(hydroxymethyl)methyl]-1-ethacrylamide |
| 11 | N-[1,1-bis(hydroxymethyl)propyl]-1-acrylamide |

We claim:

1. In a process for coating a ferrous surface by first coating with a film, heating to 250–450°F for a period of time sufficient to polymerize said film, cooling to about 30–60°C, aplying thereto a solution in a volatile solvent of a vinyl chloride polymer or copolymer, or a dispersion of a comminuted vinyl chloride polymer in a volatile liquid or a non-volatile plasticizer and heating to 250–450°F for a period of time sufficient to effect evaporation of said solvent, or coalescence of said comminuted polymer, the improvement consisting of using as said film an alkanolamide or partial polymer thereof represented by the formula

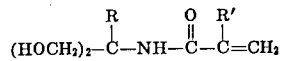

wherein R' is hydrogen, methyl or ethyl and R is methyl, ethyl or hydroxymethyl.

2. The process of claim 1 wherein R of said amide is hydroxymethyl and R' is methyl.

3. The process of claim 1 wherein R of said amide is methyl or ethyl.

4. The process of claim 3 wherein R' is methyl or ethyl.

5. The process of claim 3 wherein R' is hydrogen.

6. The process of claim 1 wherein R of said amide is hydroxymethyl and R' is ethyl.

7. The process of claim 1 wherein R of said amide is hydroxymethyl and R' is hydrogen.

8. The process of claim 1 wherein said film is said alkanolamide.

9. The process of claim 1 wherein said film is said partial polymer of said alkanolamide.

* * * * *

UNITED STATES PATENT OFFICE
CERTIFICATE OF CORRECTION

Patent No. 3,785,855         Dated January 15, 1974

Inventor(s) D. K. Sausaman and R. F. Purcell

It is certified that error appears in the above-identified patent and that said Letters Patent are hereby corrected as shown below:

Page 1, after the names and addresses of the inventors, insert
--[73] Assignee: Commercial Solvents Corporation, Terre Haute, Indiana--

Column 2, line 59, "hydroxylaklyl" should read --hydroxyalkyl--
Column 4, line 38, after "with" insert --vinyl--
Column 4, line 61, "copolyers" should read --copolymers--
Column 5, line 15, after "0.050 g" insert --were--
Column 5, line 41, "cting" should read --coating--
Column 5, line 57, "pan" should read --panel--
Column 6, line 7, "methyacrylamide" should read --methacrylamide--
Column 6, line 21, "hving" should read --having--
Column 7, line 15, claim 1, "aplying" should read --applying--

Signed and sealed this 1st day of October 1974.

(SEAL)
Attest:

McCOY M. GIBSON JR.
Attesting Officer

C. MARSHALL DANN
Commissioner of Patents